US006677021B1

(12) United States Patent
Barnette et al.

(10) Patent No.: US 6,677,021 B1
(45) Date of Patent: Jan. 13, 2004

(54) METHOD AND PRODUCT FOR GENERATING SIGNS

(75) Inventors: Charles J. Barnette, Akron, OH (US); Philip M. Zavracky, Stow, OH (US)

(73) Assignee: Kent Adhesive Products Co., Kent, OH (US)

( * ) Notice: Subject to any disclaimer, the term of this patent is extended or adjusted under 35 U.S.C. 154(b) by 837 days.

(21) Appl. No.: 08/526,914

(22) Filed: Sep. 12, 1995

Related U.S. Application Data

(63) Continuation of application No. 08/056,985, filed on May 3, 1993, now abandoned, which is a continuation of application No. 07/802,491, filed on Dec. 5, 1991, now abandoned.

(51) Int. Cl.$^{7}$ .................................................. B32B 3/00

(52) U.S. Cl. .......................... 428/40.1; 40/594; 40/615; 428/41.7; 428/42.1; 428/138; 428/195; 428/480; 428/914

(58) Field of Search ............................... 428/40.1, 41.7, 428/42.1, 480, 138, 914, 195; 40/615, 594

(56) References Cited

U.S. PATENT DOCUMENTS

| | | | | | |
|---|---|---|---|---|---|
| 1,847,574 A | * | 3/1932 | Sigel | ........................... | 156/63 |
| 2,783,172 A | * | 2/1957 | Avery | .......................... | 428/40 |
| 3,252,234 A | * | 5/1966 | Goodman | .................... | 428/40 |
| 3,887,734 A | * | 6/1975 | Chazan | ........................ | 428/40 |
| 4,517,044 A | * | 5/1985 | Arnold | ....................... | 428/202 |
| 4,855,171 A | * | 8/1989 | McKie | ........................ | 428/40 |

* cited by examiner

*Primary Examiner*—Nasser Ahmad

(74) *Attorney, Agent, or Firm*—Renner, Kenner, Greive, Bobak, Taylor & Weber

(57) ABSTRACT

A laminate for use in computerized automated sign making machines and the method for making the same are disclosed. The laminate is formed by adhesively laminating a clear polyester sheet to any suitable decorative backing sheet. The polyester sheet has a release coating on a surface thereof which adhesively receives a decorative face sheet. When introduced to an automated sign making machine, a movable knife cuts only through the face sheet, allowing selected portions of the face sheet to be removed to provide a sign of two decorative features, one defined by the face sheet, and the other by the backing sheet.

5 Claims, 1 Drawing Sheet

METHOD AND PRODUCT FOR GENERATING SIGNS

This is a continuation of application Ser. No. 08/056,985, filed May 3, 1993, now abandoned which is a continuation of prior application Ser. No. 07/802,491, filed Dec. 5, 1991 now abandoned.

TECHNICAL FIELD

The invention herein resides in the art of computerized automated sign making apparatus and techniques. More specifically, the invention relates to a method for generating a laminate for use with such sign making devices and techniques, and to the laminate itself. Specifically, the invention relates to a laminate for sign making which may be devised using a broad range of papers or like materials.

BACKGROUND ART

It is presently known that signs may be quickly and effectively devised by employing computerized automated sign making equipment. Such devices are well known in the art, and are shown by way of example in U.S. Pat. Nos. 4,467,525, 4,834,276, 4,867,363, and 4,895,287. In general, a decorative laminate is maintained upon a backing sheet and passed as a web through the sign making machine. The web moves longitudinally through the machine, while a knife blade is caused to move laterally across the web. The machine causes the web and knife to move according to a programmed control such that the desired sign, comprising letters, words, numbers, or virtually any geometric configuration, is cut into the decorative sheet. The sign, either in the form of the cut configuration, or in the form of the decorative sheet absent the cut configuration, may then be removed from the backing sheet and used appropriately as a sign or the like.

Previously, laminates have been known which are capable of instantly creating a banner. A black release liner is covered with a decorative sheet. This composite is passed through a computerized automated sign making machine and the desired message is cut into the decorative sheet. Either the message or the surrounding portion of the decorative sheet may then be removed from the black liner, exposing a message in a decorative arrangement upon a black background, or a black message upon a decorative background. This prior structure does not, however, allow the generation of a broad range of contrasting or complimenting decorative sheets to be used in association with each other in a sign making laminate. Further, this concept does not allow for the generation of a laminate from any of various types of papers, vinyl, and the like. Indeed, there is no known apparatus or technique which would, for example, allow one to generate a sign from wrapping paper, newspaper, "wallpaper", or any other generally desired type of webbing material. Accordingly, there is a need in the art for an apparatus and technique which allows for the generation of signs from virtually any type of web mediam.

DISCLOSURE OF INVENTION

In light of the foregoing, it is a first aspect of the invention to provide a laminate for use in sign making machines which can readily comprise any combination of face and backing sheets.

Another aspect of the invention is the provision of a laminate for use in automated sign making machines which is conducive to allowing wrapping paper, newspaper, and the like to be employed as a backing sheet in the laminate.

Still a further aspect of the invention is the provision of a laminate for use in a computerized automated sign making machine which is readily conducive to implementation with presently existing sign making machines, while providing a broad range of decorative combinations.

Yet a further aspect of the invention is the provision of a method for making a sign with a computerized automated sign making machine in which the laminate employed for making the sign may be devised from a broad range of materials.

Still another aspect of the invention is the provision of a method for making a sign with a computerized automated sign making machine in which various combinations of materials may be employed.

An additional aspect of the invention is the provision of a method for generating a laminate for use in an automated sign making machine and in which the laminate employs at least two decorate sheets.

The foregoing and other aspects of the invention which will become apparent as the detailed description proceeds are achieved by a laminate for use in a computerized automated sign making machine, comprising: a backing sheet; a clear cover sheet attached to said backing sheet; and a face sheet releasably adhered to said clear cover sheet.

Further aspects of the invention are attained by a method for making a sign with a computerized automated sign making machine, comprising: laminating a transparent cover sheet to a decorative backing sheet; laminating a decorative face sheet to said cover sheet, defining a laminate; cutting shapes in said laminate through said face sheet; and removing portions of said face sheet and thereby exposing portions of said decorative backing.

DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
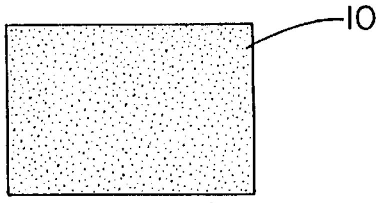
FIG. 1 is a top plan view of a decorative backing sheet employed in the invention.
Figure 2:
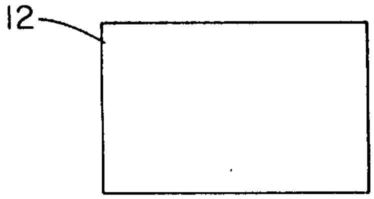
FIG. 2 is a top plan view of a decorative face sheet employed in the invention.

Referring now to the drawings and more particularly FIG. 1, it can be seen that a sheet material suitable for employment as a backing sheet in a laminate is designated generally by the numeral 10. In the preferred embodiment of the invention, the sheet 10 can be of any suitable material such as wrapping paper, newspaper, foil, and the like. With reference to FIG. 2, it can be seen that a material sheet suitable for employment as the face sheet for the laminate is designated generally by the numeral 12. Here, the material from the sheet 12 may again be of any suitable nature, but is preferably of vinyl, heavy paper, or the like as typically used in sign making machines which are presently known.

Figure 3:
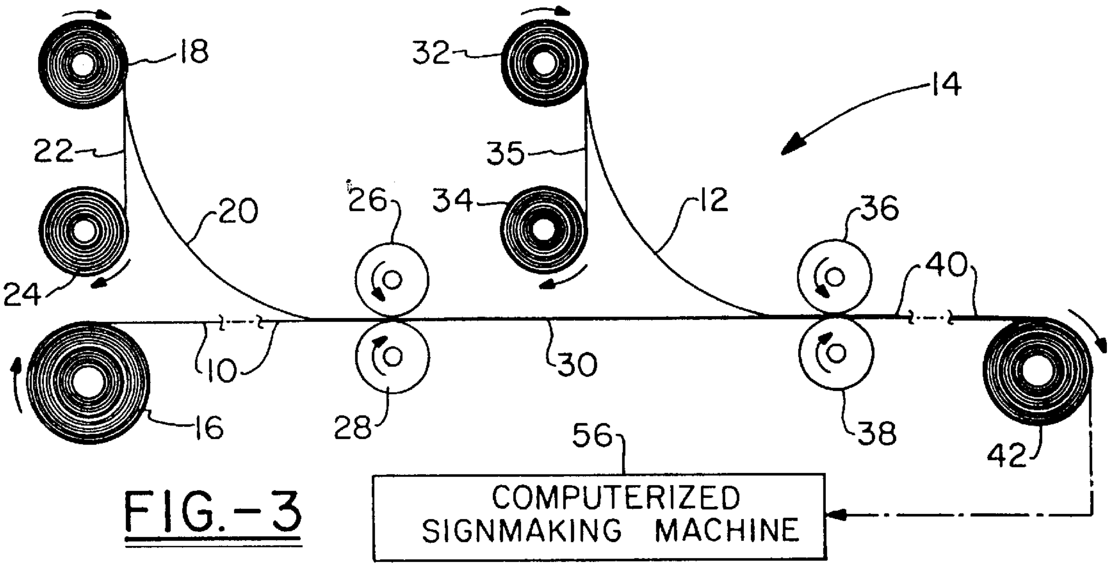
FIG. 3 is a schematic diagram of the method for making and using the sign making laminate of the invention.

According to the invention, a laminate is devised from the sheet material 10, 12 as discussed above. Since the sheet 10 may be of virtually any nature, it will be appreciated that a wide variety of laminates can therefore be devised. The method and apparatus employed and develop the laminate of the invention is designated generally by the numeral 14 as shown in FIG. 3. As illustrated, a roll 16 of the backing sheet material 10 is provided for mating engagement with a roll 18 of polyester or other suitable sheet material 20 having an adhesive coating on the back thereof and a release coating, such as of silicone or the like, on the front thereof. A release liner 22 is stripped from the adhesive layer on the polyester sheet 20 and wrapped upon the takeup roll 24 as shown. The backing sheet material 10 and the polyester sheet material 20 are introduced to the bite created between the top laminating roller 26 and the bottom laminating roller 28, as shown. Laminated backing sheet 30 is thus produced, the same comprising the sheet material 10 and a polyester sheet material 20 adhesively laminated thereto, and having a silicone release layer on an outer surface thereof.

A roll 32 of the face sheet material 12 is provided in association with a takeup roll 34 which strips a liner 35 therefrom. The liner 35 is removed from an adhesive layer maintained on the back surface of the face sheet 12. The web of the face sheet 12 is then laminated to a release coating on the top of the laminate 30 by means of engagement within the bite generated between the top laminating roller 36.and the bottom laminating roller 38. The resulting laminate or webbing 40 is now suited for implementation in a sign making machine and is taken up on an appropriate take up roll 42.

Those skilled in the art will readily appreciate that the take up roller 42 is preferably a drive roller, driven by an appropriate motor or the like, while the take up rollers 24, 34 are similarly driven. The remaining rolls and rollers of FIG. 3 may be idler rollers or be appropriately driven as will be readily appreciated by those skilled in the art.

Figure 4:
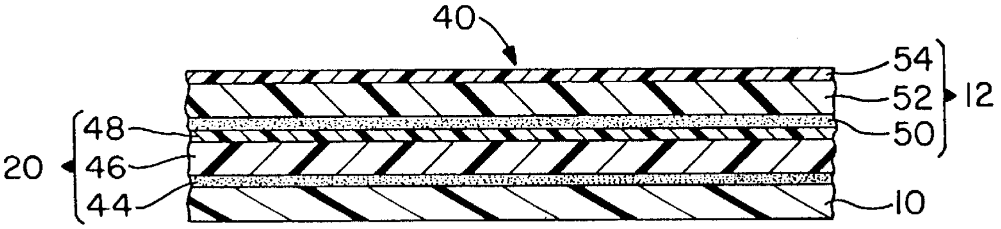
FIG. 4 is a cross sectional view of the sign making laminate according to the invention.

As shown in FIG. 4, the webbing or laminate 40 comprises a decorative backing sheet 10 with an adhesive layer 44 received thereon. A polyester film 46, having a preferred thickness of 0.002–0.008 inch and, a silicone release layer 48 on one surface thereof, is adhered on the opposite surface by means of adhesive 44 to the decorative backing sheet 10. It will be appreciated that the elements 44, 46, 48 comprise the polyester sheet material discussed above with respect to FIG. 3. As further shown, an adhesive layer 50 is attached to a decorative paper or vinyl face stock material 52 which may, if desired, have a protective cover or release liner 54 releasably attached thereto. Of course, the protective release liner 54 is optional, serving the purpose of protecting the cover of the paper or vinyl face stock 52. It will further be appreciated that the elements 50, 52, 54 would typically comprise a face material 12 as discussed above with respect to the technique and apparatus of FIG. 3.

With reference again to FIG. 3, it can be seen that the sign making laminate 40 may be employed in a computerized automated sign making machine 56 of the type well known and understood by those skilled in the art, and as shown in the prior art patents described above. It will be appreciated by those skilled in the art that the laminate 40 is fed to the sign making machine 56 which is programmed to cut letters, numbers, and other geometric configurations from the laminate 40. The knife, operative to move laterally with respect to the web 40, is weighted or otherwise controlled to cut only through the paper or vinyl face stock 52 and into the adhesive layer 50 or release coating 48.

Figure 5:
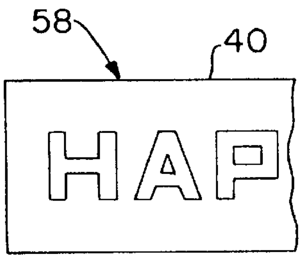
FIG. 5 is top plan view of the laminate of the invention having passed through a sign making machine.
Figure 6:
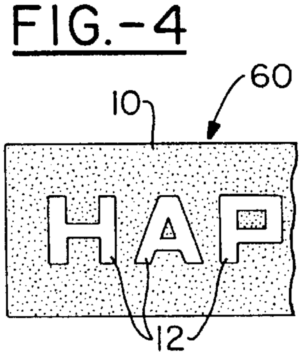
FIG. 6 is a top plan view of the laminate of FIG. 5, showing the sign after removal of the face sheet surrounding the letters cut therefrom.
Figure 7:
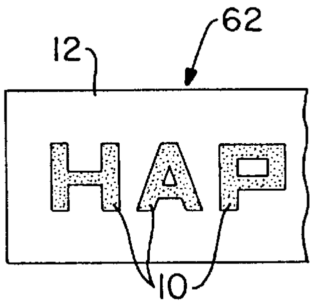
FIG. 7 is a top plan view of the laminate of FIG. 5, showing the same after removal of the letters cut from the face sheet.

FIG. 5 illustrates a sheet 58 having portions of a message cut therein as by a computerized automated sign making machine 56. The letters "HAP" are shown as having been cut through the thickness of the paper or vinyl face stock 52. In FIG. 6, the sign 60 is developed from the sheet 58 by removing all of the portions of the face sheet 12 except for the letters "HAP," thus presenting such letters upon the decorative background of the backing sheet material 10. In contradistinction, the sign 62 shown in FIG. 7 is generated by removing the portions of the face sheet 12 which are cut in the configuration of the letters "HAP," exposing the decorative backing sheet 10 in the portions configured as the letters, while allowing the remainder of the face sheet material 12 to mask the decorative backing sheet material 10. It will be readily appreciated by those skilled in the art that the signs 60, 62 are simply reverse images of each other, the difference simply being the portions of the decorative face stock material 12 being removed.

It should now be readily apparent to those skilled in the art that any of numerous types of sign configurations may be devised using the concept and apparatus of the instant invention. Any combination of decorative face and backing sheets may be employed. Indeed, standard sign making stock may be used, or any other material can be laminated with a transparent polyester sheet having a release coating thereon, the resultant sub-laminate being employed as the backing sheet material.

It will, of course, also be understood and appreciated by those skilled in the art that the various laminates and adhesives employed are preferably nonacetic and nonyellowing. The actual sheet materials used for forming the laminate 40 may consist of decorative wrapping papers, newspaper, "wallpaper", foil, or virtually any type of web material which has the polyester release sheet laminated thereto.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A laminate for use in a computerized automated sign making machine, comprising:

a laminated backing sheet comprising a backing sheet having, a decorative side and a clear cover sheet having an adhesive coating on a first side thereof adhesively laminating said clear cover sheet to said decorative side of said backing sheet, said clear cover sheet having a release coating on a second opposite side thereof; and a face sheet releasably adhered to said release coating on said laminated backing sheet said decorative side of said backing, sheet, clear cover sheet, adhesive coating, release coating and face sheet being fully overlapping and congruent with each other such that portions of said face sheet are removable when cut from said laminated backing sheet by the computerized automated signmaking machine, exposing corresponding portions of said decorative side of said backing sheet.

2. The laminate according to claim 1, wherein said cover sheet comprises a polyester film.

3. The laminate according to claim 2, wherein said backing sheet comprises a decorative wrapping paper.

4. The laminate according to claim 2, wherein said polyester film has a thickness of 0.006–0.008 inch.

5. The laminate according to claim 2, wherein said face sheet has an adhesive coating on a back side thereof and in contacting engagement with said release coating of said cover sheet.

* * * * *